United States Patent [19]

Yanagisawa

[11] Patent Number: 4,908,639

[45] Date of Patent: Mar. 13, 1990

[54] OPTICAL SYSTEM HAVING A VARIABLE OUT-OF-FOCUS STATE

[75] Inventor: Masaaki Yanagisawa, Tokyo, Japan

[73] Assignee: Nikon Corporation, Tokyo, Japan

[21] Appl. No.: 334,157

[22] Filed: Apr. 6, 1989

[30] Foreign Application Priority Data

Apr. 11, 1988 [JP] Japan .................................. 63-88454

[51] Int. Cl.⁴ ......................... G02B 13/20; G02B 9/62
[52] U.S. Cl. ..................................... 350/431; 350/464
[58] Field of Search ................. 350/431, 464, 448–450

[56] References Cited

U.S. PATENT DOCUMENTS

| | | | |
|---|---|---|---|
| 4,013,347 | 3/1977 | Nakamura | 350/431 |
| 4,124,276 | 11/1978 | Okano et al. | 350/431 |
| 4,310,221 | 1/1982 | Momiyama et al. | 350/431 |
| 4,466,710 | 8/1984 | Kato et al. | 350/431 X |
| 4,466,711 | 8/1984 | Yokota | 350/431 X |
| 4,826,301 | 5/1989 | Ikemori | 350/431 |

Primary Examiner—Scott J. Sugarman
Attorney, Agent, or Firm—Shapiro and Shapiro

[57] ABSTRACT

An optical system includes a forward group having a first lens group of positive focal length and a seconds lens group of negative focal length, the forward group having a positive focal length, a stop, and a rearward group having a positive focal length. The forward group, the stop and the rearward group are disposed in the named order from the object side. The spacing between the first lens group and the second lens group may be varied along the optic axis to thereby fluctuate the spherical aberration and coma of the optical system and vary the depictive property of the image of the defocus area and also, fluctuate the astigmatism of the optical system following the fluctuations of the spherical aberration and coma, thereby maintaining the flatness of the image plane. The optical system is constructed so as to satisfy the following conditions:

$$0.5 < |f_2/f| < 1.0$$

$$0.5 < |f_1/f_2| < 1.5$$

where f is the focal length of the entire system of the optical system, and $f_1$ and $f_2$ are the focal lengths of the first lens group and the second lens group, respectively.

5 Claims, 7 Drawing Sheets

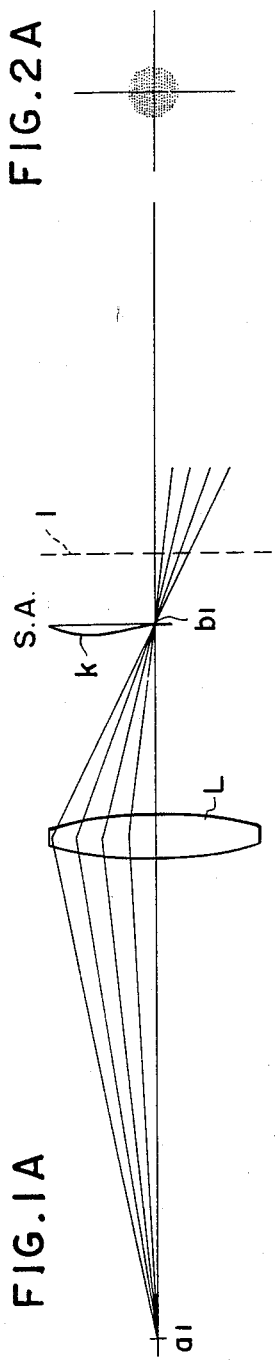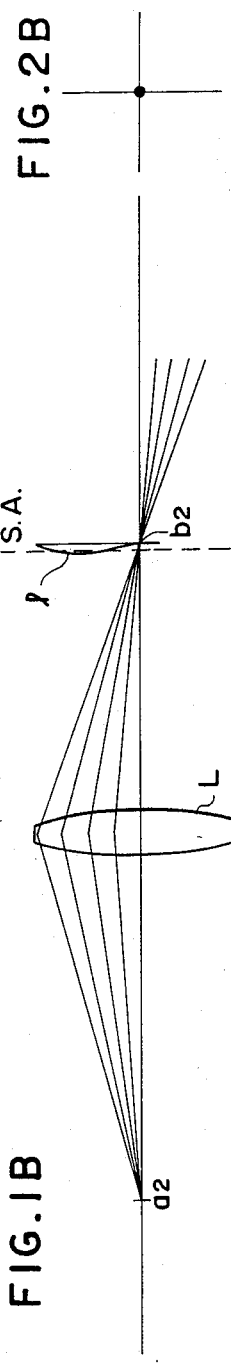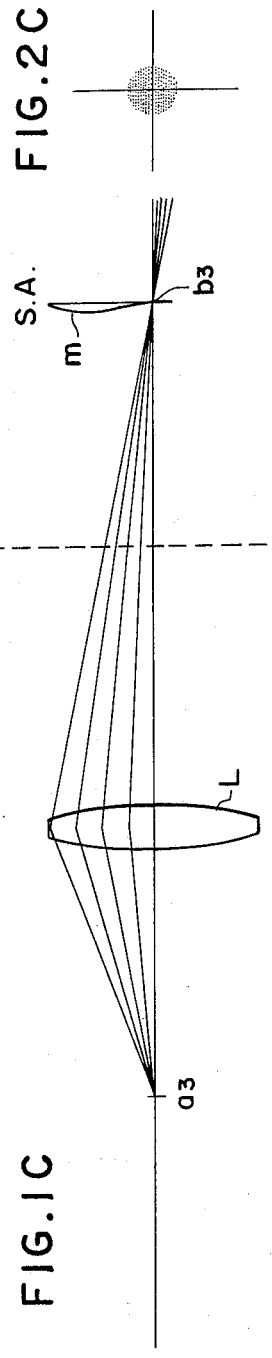

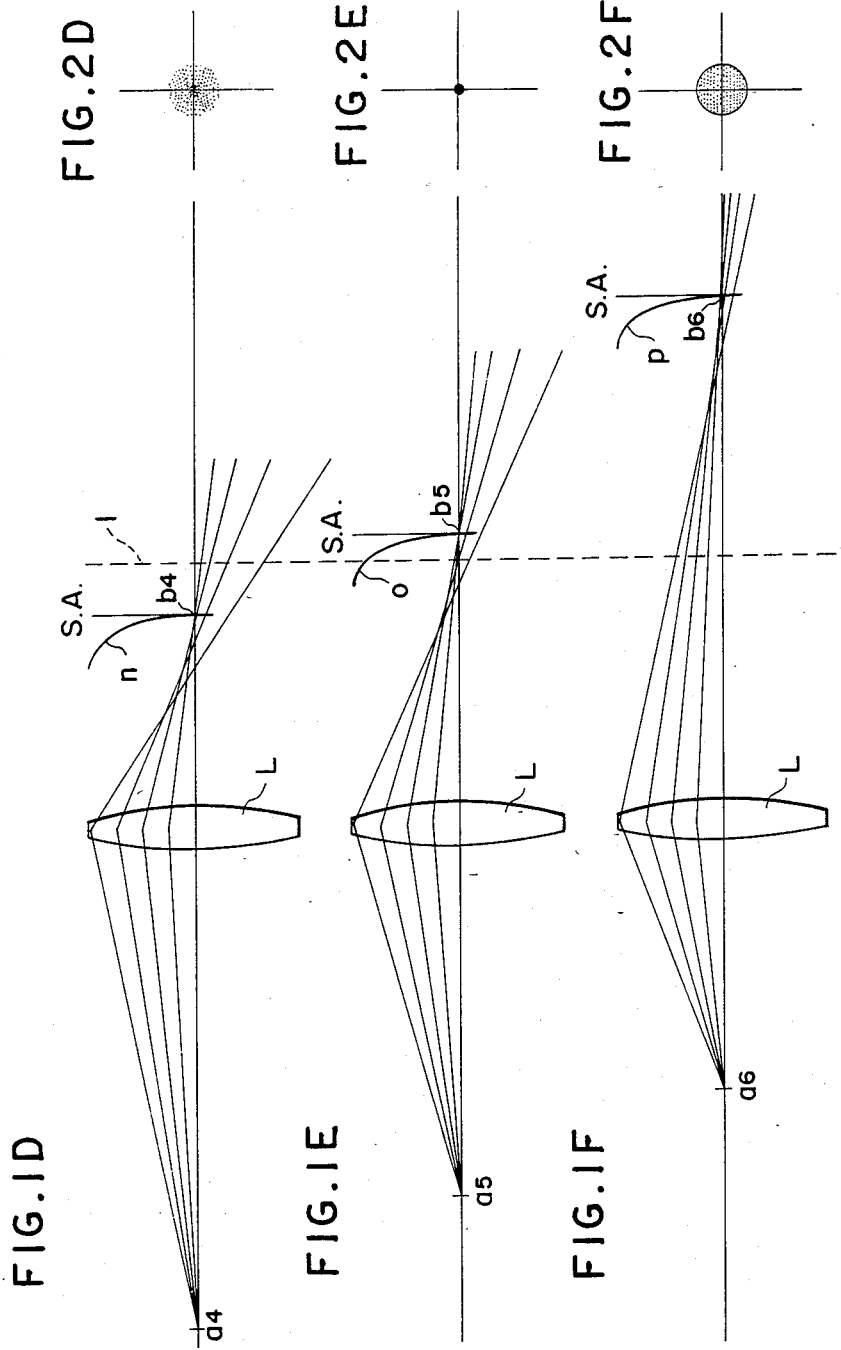

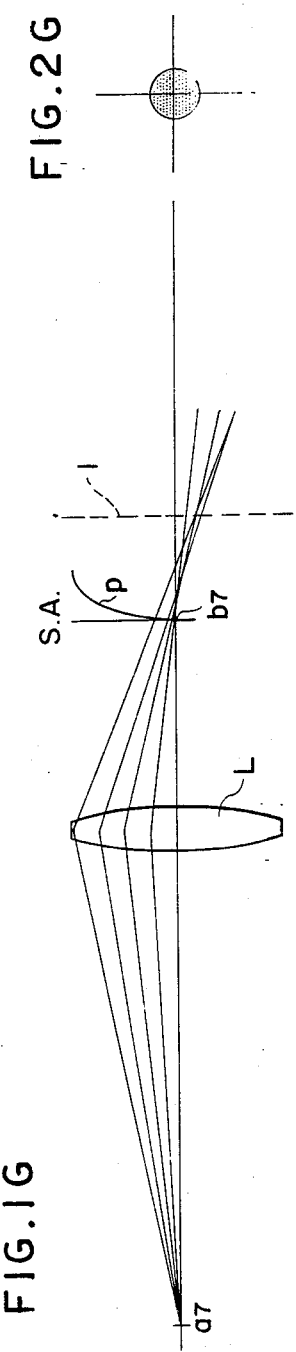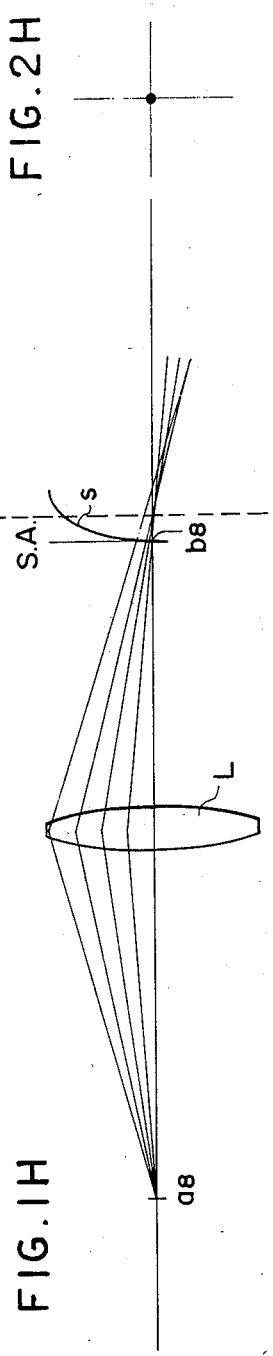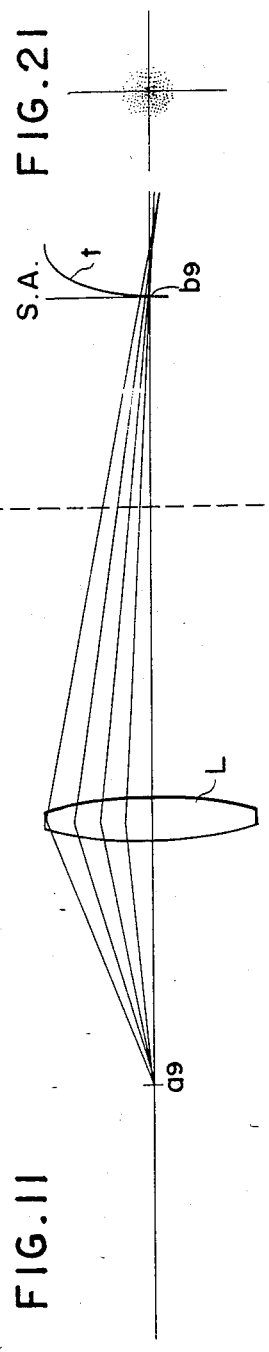

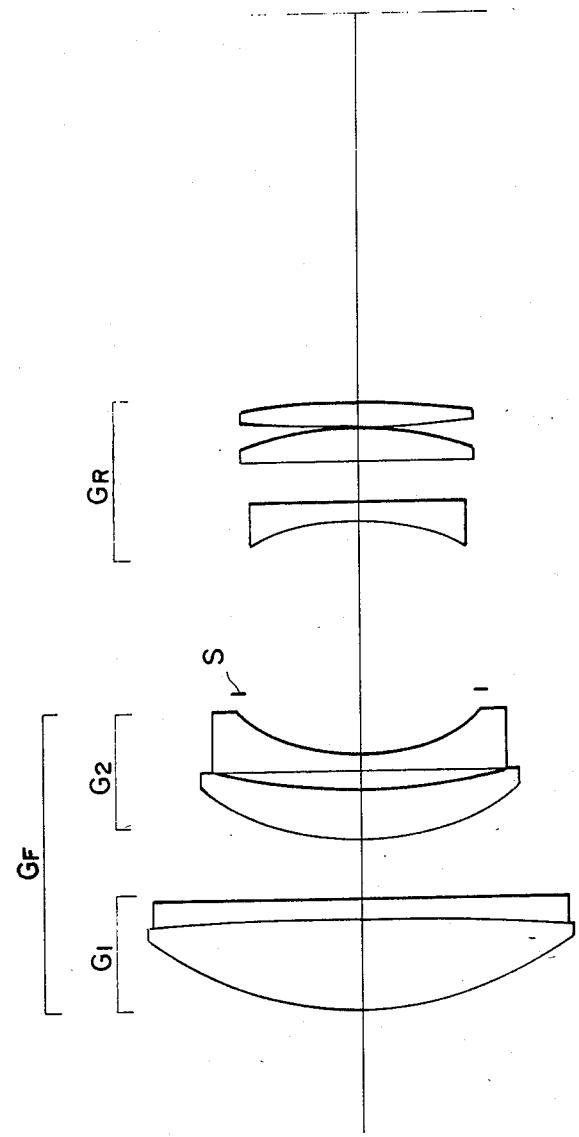

OPTICAL SYSTEM HAVING A VARIABLE OUT-OF-FOCUS STATE

BACKGROUND OF THE INVENTION

1. Field of the Invention

This invention relates to an optical system suitable for a great relative aperture long focus lens having the function of maintaining a sharp depicting performance for an object which is in focus (the main object) and yet varying the depictive property of out-of-focus of a long distance object (the background) outside the depth of field or a short distance object (the foreground) outside the depth of field.

Accordingly, the present invention basically differs in character from a conventional soft focus lens in which the amount of spherical aberration which occurs is varied to thereby vary the depictive property of the main object.

2. Related Background Art

When a cubic object has been photographed, an object off the depth of field is depicted as an out-of-focus image in the photograph, but generally, a photograph in which the edge portion of the out-of-focus image is clear-cut and two-line blur are not liked.

In contrast, to make the main object conspicuous, an out-of-focus image in which the edge portion in the defocus area is unclear and soft is also an important picture plane constituent, and the depictive property of this out-of-focus image is the subject of evaluation in the aesthetic viewpoint of photographs.

So, there are known numerous optical systems in which spherical aberration is intentionally created to realize low contrast depiction.

For example, a special optical element which is rotation-symmetrical with respect to the optic axis and in which the central portion is a parallel flat plate and the marginal portion has a refractive power or a certain transmittance characteristic and which is disposed in a lens system is disclosed in U.S. Pat. No. 4,013,347.

Also, optical systems in which the air space between lenses is varied to thereby realize low contrast depiction are disclosed in U.S. Pat. Nos. 4,124,276 and 4,310,221.

However, in U.S. Pat. No. 4,013,347 a special optical element is designed in a photo-taking lens system so as to be moved along the optic axis and therefore, the construction is complicated and this is not preferable.

Also, in U.S. Pat. Nos. 4,124,276 and 4,310,221, if the optical systems thereof are used for a great relative aperture long focus lens, a great driving force is required during focusing because they are of the focusing type in which the whole is axially moved, and it is difficult to effect quick focusing and further, there is the tendency of the lens barrel becoming complicated, and this is not preferable.

Also, there has heretofore been no lens for low contrast depiction which can obtain sharp depiction for the main object to which the lens is in focus and which realizes the depictive property in which, for the foreground or the background, the out-of-focus state is varied in conformity with the photographer's liking.

SUMMARY OF THE INVENTION

Accordingly, the present invention has as its object the provision of an optical system which can extract the depictive property of out-of-focus state differing from that of the conventional soft focus lens and can vary spherical aberration from an under-corrected state to an over-corrected state to thereby extract different depictive properties and moreover which is compact and rich in operability and which has an excellent imaging performance over infinity to a short distance.

BRIEF DESCRIPTION OF THE DRAWINGS

FIGS. 1A, 1B, 1C, 1D, 1E, 1F, 1G, 1H and 1I illustrate the principle of the present invention.

FIGS. 2A, 2B, 2C, 2D, 2E, 2F, 2G, 2H and 2I show the point image distributions in FIGS. 1A, 1B, 1C, 1D, 1E, 1F, 1G, 1H and 1I, respectively.

FIG. 4 shows the lens construction of a second embodiment of the present invention.

DESCRIPTION OF THE PREFERRED EMBODIMENTS

Figure 3:
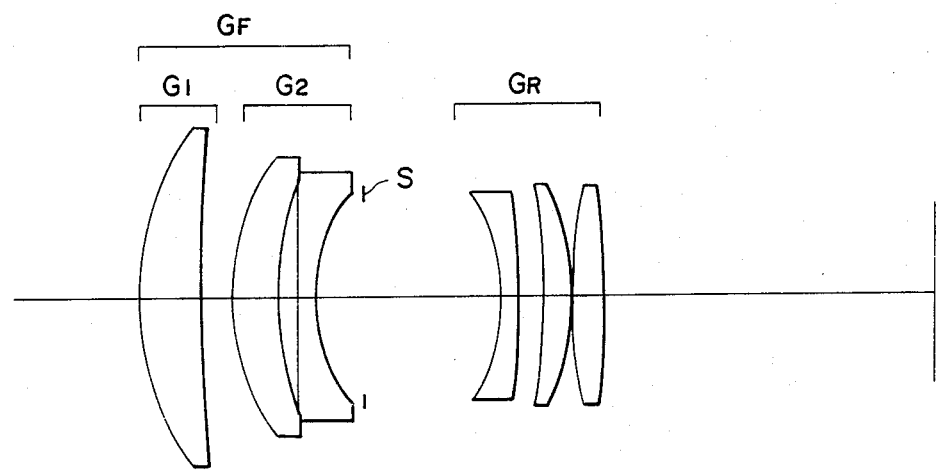
FIG. 3 shows the lens construction of a first embodiment of the present invention.
Figure 5A:
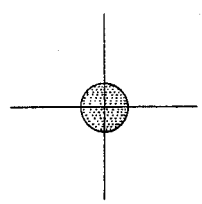
FIGS. 5A, 5B, 5C, 5D, 5E, 5F, 5G, 5H and 5I show the point image distributions of the spherical aberration of the first embodiment of the present invention.
Figure 5B:
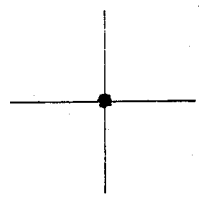
Figure 5C:
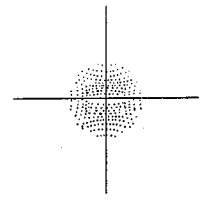
Figure 5D:
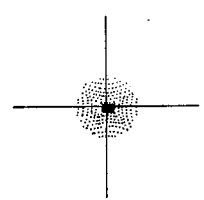
Figure 5E:
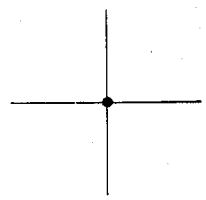
Figure 5F:
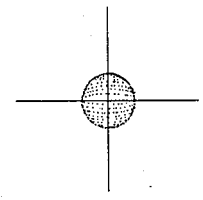
Figure 5G:
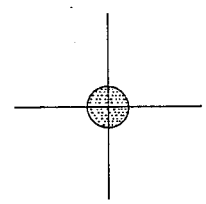
Figure 5H:
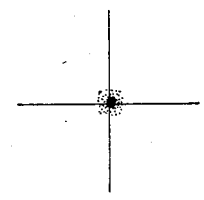
Figure 5I:
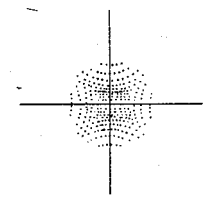
Figure 6A:
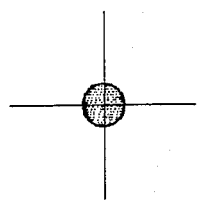
FIGS. 6A, 6B, 6C, 6D, 6E, 6F, 6G, 6H and 6I show the point image distributions of the spherical aberration of the second embodiment of the present invention.
Figure 6B:
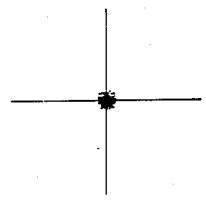
Figure 6C:
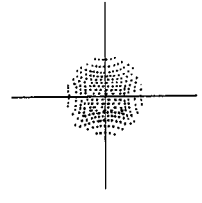
Figure 6D:
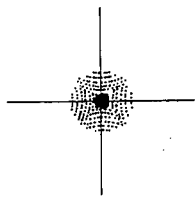
Figure 6E:
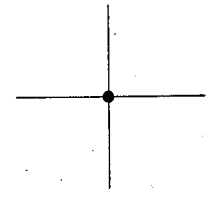
Figure 6F:
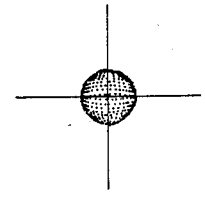
Figure 6G:
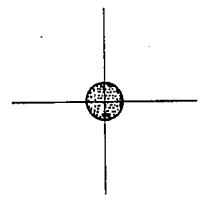
Figure 6H:
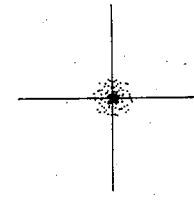
Figure 6I:
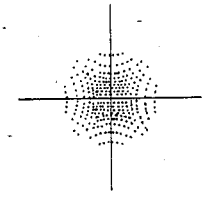

The present invention has, in succession from the object side, a forward group $G_F$ having a positive focal length, a stop S and a rearward group $G_R$ having a positive focal length, the forward group $G_F$ having a first lens group G1 of a positive focal length and a second lens group G2 of a negative focal length, and is constructed so as to have such a function that the spacing between the first lens group G1 and the second lens group G2 is varied along the optic axis, whereby spherical aberration and coma are fluctuated to vary the depictive property of an out-of-focus image in the defocus area and fluctuate astigmatism as well following the fluctuations of spherical aberration and coma, thereby maintaining the flatness of the image plane.

The present invention is constructed so as to satisfy the following conditions in such construction:

$$0.5 < |f_2/f| < 1.0 \tag{1}$$

$$0.5 < |f_1/f_2| < 1.5 \tag{2}$$

where f is the focal length of the entire system, and $f_1$ and $f_2$ are the focal lengths of the first lens group G1 and the second lens group G2, respectively.

In the present invention, the spacing between the first lens group G1 and the second lens group G2 is varied to thereby vary spherical aberration. Here, what has been described about spherical aberration also holds true of coma occurring due to the off-axis light flux and therefore, description is omitted about such coma, and for the convenience of description, spherical aberration will hereinafter be described as the representative of two aberrations, i.e., spherical aberration and coma.

Generally, if in a state in which aberrations are corrected in a photo-taking lens L, the background, the main object and the foreground all exist in the depth of field, the background is imaged short of the film surface, the main object is imaged on the film surface and the foreground is imaged rearwardly of the film surface.

If the diameters of point images in the background and the foreground are imaged with a size in the allowable blur circle, they will be recognized as sharp images to the human eyes.

However, if the foreground and the background are imaged in the defocus area, they will be depicted as blur in a photograph.

Now, FIGS. 1A-1I illustrate the principle of the present invention, and FIGS. 2A-2I show point image distributions corresponding to FIGS. 1A-1C, respectively.

The principle of the present invention will hereinafter be described with reference to these figures. In FIGS. 1A-1I, the lens is in focus to main objects $a_2$, $a_5$ and $a_8$, and the images of the foreground and the background are defocus images imaged in the defocus area.

First, FIGS. 1A-1C show the principle of the present invention in the background, the main object and the background in the state in which spherical aberration is corrected (so-called full correction), and FIGS. 2A-2C show the point image distributions of the main object $a_2$ on the best image plane I which correspond to FIGS. 1A—1C, respectively.

As shown in FIG. 1A, even if the height at which the lights from the object point $a_1$ in the background are incident on the photo-taking lens L becomes great, these lights are imaged so as to intersect one another substantially at a point short of the best image plane I indicated by dotted line, and the spherical aberration (S.A.) at a paraxial image point position $b_1$ is corrected as indicated by a curve k. The point image distribution on the best image plane I in this state is an out-of-focus image in which the density of light rays is generally uniform as shown in FIG. 2A.

Also, as shown in FIG. 1B, even if the height at which the lights from the object point $a_2$ of the main object are incident on the photo-taking lens becomes great, these lights are imaged so as to intersect one another substantially at a point near the best image plane I indicated by dotted line, and the spherical aberration (S A.) at a paraxial image point position $b_2$ is corrected as indicated by a curve l. The point image distribution on the best image plane I in this state is such as shown in FIG. 2B wherein the point image concentrates substantially at a point, and the diameter of this point image is imaged at a size in the allowable blur circle and therefore, a sharp image is obtained.

Further, as shown in FIG. 1C, even if in a state in which spherical aberration is corrected, the height at which the lights from the object point $a_3$ are incident on the photo-taking lens L becomes great, these lights are imaged so as to intersect one another substantially at a point at a position $b_3$ rearward of the best image plane I indicated by dotted line, and the spherical aberration (S.A.) at a paraxial image point position $b_3$ is corrected as indicated by a curve m. The point image distribution on the best image plane I in this state, as shown in FIG. 2C, is an out-of-focus image in which the density of light rays is generally uniform as in FIG. 2A.

In the present invention, when the first lens group G1 having a positive refractive power is fixed and the second lens group G2 having a negative refractive power is moved toward the image side along the optic axis, the incidence height of the most marginal ray from infinity (including the on-axis) parallel to the optic axis passed through the first lens group G1 becomes low on the object side surface of the second lens group G2. Therefore, the light ray from the on-axis object point passed through the first lens group G1 is small subjected to the diverging action of the second lens group G2 and thus, spherical aberration is under-corrected. As spherical aberration becomes under-corrected (so-called under-correction), the best image plane I moves toward the object side.

Description will hereinafter be made of the principle of the present invention in the taste in which spherical aberration is under-corrected.

FIGS. 1D-1F show the principles of the present invention in the background, the main object and the foreground in the state in which spherical aberration is under-corrected, and FIGS. 2D-2F show the point distributions of the main object $a_5$ on the best image plane I corresponding to FIGS. 1D-1F, respectively.

First, as shown in FIG. 1D, as the height at which the lights from the object point $a_4$ in the background are incident on the photo-taking lens L becomes greater, these lights are imaged at a position short of a paraxial image point position $b_4$. Therefore, the spherical aberration (S.A.) at the paraxial image point position $b_4$ is under-corrected as indicated by a curve n. Since the best image plane I indicated by dotted line is positioned more rearwardly than the paraxial image point $b_4$, the point image distribution on the best image plane I has a core at the center of the image, as shown in FIG. 2D, and the density of the light flux near the outer periphery of the image becomes low, and the image is surrounded by the halo of soft light and thus, a generally soft out-of-focus image results.

Also, as shown in FIG. 1E, as the height at which the lights from the object point $a_5$ of the main object are incident on the photo-taking lens L becomes greater, these lights are imaged short of a paraxial image point position $b_5$. Therefore, the spherical aberration (S.A.) at the paraxial image point position $b_5$ is under-corrected as indicated by a curve O. Since the best image plane I indicated by dotted line is positioned near the front of the paraxial image point position $b_5$, the point image distribution on the best image plane I is such that the point image concentrates substantially at a point as shown in FIG. 2E, and the diameter of this point image is imaged at a size in the allowable blur circle and therefore, a sharp image is obtained.

Further, as shown in FIG. 1F, as the height at which the lights from the object point $a_6$ in the foreground are incident on the photo-taking lens L becomes greater, these lights are imaged short of a paraxial image point $b_6$. Therefore, the spherical aberration (S.A.) at the paraxial image point position $b_6$ is under-corrected as indicated by a the best image plane I indicated by dotted line is positioned more forwardly than the paraxial image point $b_6$, the point image distribution on the best image plane I is such that as shown in FIG. 2F, the density of the light flux near the outer perphery is high and thus, a clear out-of-focus image or two-line blur of the edge portion tends to occur.

On the other hand, when the first lens group G1 having a positive refractive power is fixed and the second lens group G2 having a negative refractive power is moved toward the object side along the optic axis, the incidence height of the most marginal ray passed through the first lens group G1 becomes greater on the object side surface of the second lens group G2. Therefore, the most marginal ray passed through the first lens group G1 is greatly subjected to the diverging action of the second lens group G2 and thus, spherical aberration is over-corrected. As spherical aberration becomes over-corrected (so-called over-correction), the best image plane I moves toward the image side.

Description will hereinafter be made of the principle of the present invention in the state in which spherical aberration is over-corrected.

FIGS. 1G–1I show the principles of the present invention in the background, the main object and the foreground in the state in which spherical aberration is over-corrected, and FIGS. 2G–2I show the point image distributions of the main object as on the best image plane I corresponding to FIGS. 1G–1I, respectively.

First, as shown in FIG. 1G, as the height at which the lights from the object point $a_7$ in the background are incident on the photo-taking lens L in the state in which spherical aberration is over-corrected becomes greater, these lights are imaged at a position rearward of a paraxial image point position $b_7$. Therefore, the spherical aberration (S.A.) at the paraxial image point position $b_7$ is over-corrected as indicated by a curve q. Since the best image plane I indicated by dotted line is positioned more rearwardly than the paraxial image point position $b_7$, the point image distribution on the best image plane I is such that as shown in FIG. 2G, the density of the light flux near the outer periphery is high, and a clear out-of-focus image or two-line blur of the edge portion tends to occur.

Further, as shown in FIG. 1H, as the height at which the lights from the object point $a_8$ of the main object are incident on the photo-taking lens L becomes greater, these lights are imaged rearwardly of a paraxial image point position $b_8$. Therefore, the spherical aberration (S.A.) at the paraxial image point position $b_8$ is over-corrected as indicated by a curve s. Since the best image plane I indicated by dotted line is positioned near the rear of this paraxial image point, the point image distribution on the best image plane I is such that as shown in FIG. 2H, the point image concentrates substantially at a point, and the diameter of this point image is imaged at a size in the allowable blur circle and therefore, a sharp image is obtained.

Further, as shown in FIG. 1I, as the height at which the lights from the object point $a_9$ in the foreground are incident on the photo-taking lens L becomes greater, these lights are imaged rearwardly of a paraxial image point position $b_9$. Therefore, the spherical aberration (S.A.) at the paraxial image point position $b_9$ is under-corrected as indicated by a curve t. Since the best image plane I indicated by dotted line is positioned forwardly of the paraxial image point $b_9$, the point image distribution on the best image plane I has a core at the center of the image as shown in FIG. 2I, and the density of the light flux near the outer periphery of the image is low, and the image is surrounded by the halo of soft light and thus, a generally soft out-of-focus image results.

Thus, when spherical aberration is compared between the over-corrected state and the under-corrected state, the manners in which the out-of-focus states of the background and the foreground are provided tend to be opposite to each other. Therefore, by under-correcting or over-correcting spherical aberration, it is possible to obtain the depictive property in which the out-of-focus states of the foreground and the background differ from each other while keeping a sharp state of the main object.

The present invention can adopt a system whereby at least one of the first lens group G1 and the second lens group G2 is moved to cause spherical aberration to occur, but to strengthen the shock resistance of the lens barrel or improve the operability and achieve compactness, a system whereby the first lens group G1 is fixed and the second lens group G2 is moved along the optic axis is more desirable.

Now, the conventional soft focus lens adopts a construction in which in order to vary the low-contrast depictive property in the main object, the air space between lenses is varied to cause only spherical aberration to occur and spherical aberration is corrected so that astigmatism and curvature of image field do not fluctuate.

Therefore, if the conventional low-contrast depicting system is adopted particularly in a great relative aperture long focus lens of a shallow depth of focus, astigmatism and curvature of image field will not vary even if the best image plane of the central portion (the vicinity of the center) of the picture plane is varied by the fluctuation of spherical aberration, and thus the best image plane of the marginal portion of the picture plane will not vary.

Accordingly, if an attempt is made to extract the depictive property intended by the present invention, it will be difficult for the best image plane of the marginal portion of the picture plane in the conventional soft focus lens to follow the variation in the best image plane of the central portion of the picture plane caused by the fluctuation of spherical aberration, and this leads to the problem that the flatness of the entire image plane is spoiled.

Therefore, if an attempt is made to photograph an object image lying at a distance equal to the main object and existing in the marginal portion of this main object (hereinafter referred to as the marginal portion of the main object) with the main object, a photograph will be taken with the central portion of the main object being in a sharp state and with the image of the marginal portion of the main object being in an out-of-focus state.

To take a photograph with the main object and the marginal portion of the main object always being in a sharp state like this, the image plane of the marginal portion of this main object must also be corrected at the same time.

So, the present invention is designed so as to have function of not only varying the air space between the first lens group G1 and the second lens group G2 to thereby cause spherical aberration to occur, but also causing astigmatism to occur following the fluctuation of this spherical aberration and thereby maintaining the flatness of the image plane.

To ensure such an out-of-focus state to be extracted while achieving compactness and yet making the imaging in the main object good, it is necessary to construct the present invention so as to satisfy the above-mentioned conditions (1) and (2). These conditions will hereinafter be described in detail.

The condition (1) prescribes the ratio between the refractive powers of the second lens group G2 and the entire system, and is a condition for obtaining desired spherical aberration, coma and astigmatism by a smallest possible amount of movement to mitigate the mechanical burden when varying the spacing between the first lens group G1 and the second lens group G2 to thereby control spherical aberration, coma and astigmatism.

However, if the upper limit of this condition (1) is exceeded, the amounts of movement of the lens groups when controlling these aberrations will become great. Conversely, if the lower limit of this condition is exceeded, when the lens groups are moved to obtain an out-of-focus state, the fluctuations of coma and astigmatism will become very great as compared with the fluctuation of spherical aberration, and this is not preferable.

Also, the condition (2) prescribes the ratio between the powers of the first lens group G1 and the second lens group G2, and controls the fluctuations of spherical aberration, coma and astigmatism and the amounts of movement of the lens groups. However, if the upper limit of this condition (2) is exceeded, the amounts of movement of the lens group when controlling aberrations will become great and this will result in the bulkiness of the lens system which is not preferable. Conversely, if the lower limit of this condition (2) is exceeded, it will become difficult in manufacture to obtain the edge thickness of the foremost lens. Also, if the lens groups are moved to obtain an out-of-focus state, the fluctuations of coma and astigmatism will become very great as compared with the fluctuation of spherical aberration, and this is not preferable.

To adopt this rear focus system in the optic system of the present invention to thereby further improve the short distance imaging performance of the present invention and extract a good depicting performance, it is desirable to construct the present invention so as to satisfy the following condition:

$$0.7 < f_R/f < 0.9 \tag{3}$$

where $f_R$ is the focal length of the rearward group $G_R$ and f is the focal length of the entire system.

If the upper limit of this condition (3) is exceeded, the amount of movement of the rearward group $G_R$ will become great when focusing to a short distance object and the mechanical interference thereof with the forward group $G_F$ will occur, and this is not preferable. Conversely, if the lower limit of this condition (3) is exceeded, the fluctuations of aberrations occurring during focusing in a state in which the object distance differs will become great, and this is not preferable.

If the spacing between the first lens group G1 and the second lens group G2 is varied to vary spherical aberration and astigmatism, the fluctuation of the image plane will occur. Therefore, the correction of this image plane is possible by moving at least one lens in the rearward group in the present invention along the optic axis.

However, not only to improve the operability for providing an out-of-focus state, but also to maintain a compact shape and simplify the lens barrel mechanism, it is desirable to endow the rearward group $f_R$ of the present invention with the focusing function and the image plane position correcting function.

(Embodiments)

Embodiments of the present invention will hereinafter be described. Each embodiment is a great relative aperture long focus lens, and the lens constructions of first and second embodiments are shown in FIGS. 3 and 4, respectively. The first lens group G1 in the first embodiment is comprised of a positive meniscus lens having its convex surface facing the object side, while the first lens group G1 in the second embodiment is comprised of a cemented lens comprising a convex lens having its surface of sharper curvature facing the object side and a biconcave lens.

The numerical values of the first and second embodiments will be shown below. In the tables below, the numbers at the left end represent the order from the object side, γ represents the radius of curvature of each lens surface, d represents the center spacing between lens surfaces, and ν and n represent the abbe number and the refractive index, respectively, for d-line (λ=587.6 nm).

Further f represents the focal length of the entire system, FN represents F-number, and 2ω represents the angle of view. Also, a first position (1-Pos) is a state in which focusing to infinity has been effected with spherical aberration corrected, a second position (2-Pos) is a state in which focusing to a short distance (1/30) has been effected with spherical aberration corrected, a third position (3-Pos) is a state in which focusing to a short distance (1/30) has been effected with spherical aberration under-corrected, and a fourth position (4-Pos) is a state in which focusing to a short distance (1/30) has been effected with spherical aberration over-corrected. Further, β is the short distance photographing magnification, and D0 is the distance from the object to the first lens surface.

TABLE 1

(First Embodiment)
f = 105, FN = 2, 2ω = 23°

| No | Radius of Curvatur r | Center thickness and spacing d | Refractive index n | Abbe number ν |
|---|---|---|---|---|
| 1 | 48.000 | 10.000 | 1.670249 | 57.53 |
| 2 | 446.083 | (variable) | | |
| 3 | 38.635 | 7.500 | 1.693500 | 53.72 |
| 4 | 66.090 | 2.500 | | |
| 5 | 255.958 | 3.000 | 1.688930 | 31.08 |
| 6 | 26.161 | (variable) | | |
| 7 | −31.507 | 3.000 | 1.717360 | 29.46 |
| 8 | −111.660 | 4.000 | | |
| 9 | −94.587 | 4.800 | 1.766840 | 46.80 |
| 10 | −40.030 | 0.200 | | |
| 11 | 112.887 | 4.800 | 1.796681 | 45.37 |
| 12 | −157.361 | (Bf) | | |

| 1 pos f = 105.0000 | 2 pos β = −0.0333 | 3 pos β = −0.0333 |
|---|---|---|
| D0 ∞ | 3100.4970 | 3100.4969 |
| d2 5.0000 | 5.0000 | 5.2000 |
| d6 30.0000 | 25.2089 | 25.3702 |
| Bf 52.7752 | 57.5663 | 57.2050 |

| 4 pos β = −0.0333 | |
|---|---|
| D0 | 3100.4968 |
| d2 | 4.9000 |
| d6 | 25.1293 |
| Bf | 57.7459 |

TABLE 2

(Second Embodiment)
f = 135, FN = 2, 2ω = 18°

| No | Radius of Curvatur r | Center thickness and spacing d | Refractive index n | Abbe number ν |
|---|---|---|---|---|
| 1 | 58.000 | 14.500 | 1.620409 | 60.14 |
| 2 | −569.905 | 3.000 | 1.648311 | 33.75 |
| 3 | 897.932 | (variable) | | |
| 4 | 44.435 | 8.000 | 1.713000 | 53.93 |
| 5 | 100.005 | 2.600 | | |
| 6 | 626.470 | 3.000 | 1.749501 | 35.19 |
| 7 | 32.305 | (variable) | | |
| 8 | −40.174 | 3.000 | 1.688930 | 31.08 |
| 9 | −2506.608 | 7.000 | | |
| 10 | −412.962 | 5.000 | 1.766840 | 46.80 |
| 11 | −58.526 | 0.200 | | |
| 12 | 165.943 | 4.000 | 1.796681 | 45.37 |
| 13 | −136.822 | (Bf) | | |

| 1 pos f = 135.0000 | 2 pos β = −0.0333 | 3 pos β = −0.0333 |
|---|---|---|
| D0 ∞ | 3938.0404 | 3938.0404 |

TABLE 2-continued (Second Embodiment)
f = 135, FN = 2, 2 ω = 18°

| d3 | 10.0000 | 10.0000 | 10.2000 |
|---|---|---|---|
| d7 | 37.2882 | 30.4792 | 30.6648 |
| Bf | 61.1450 | 67.9540 | 67.5683 |

4 pos
β = −0.0333

| D0 | 3938.0404 |
|---|---|
| d3 | 9.9000 |
| d7 | 30.3875 |
| Bf | 68.1457 |

TABLE 3

(Condition-Corresponding Values)

| Embodiment | $\left\|\frac{f_2}{f}\right\|$ | $\left\|\frac{f_1}{f_2}\right\|$ | $\frac{f_R}{f}$ |
|---|---|---|---|
| 1 | 0.76 | 0.99 | 0.82 |
| 2 | 0.74 | 0.99 | 0.78 |

In each of the embodiments of the present invention, to render spherical aberration under-corrected, the first lens group G1 is fixed and the second lens group G2 is moved to the image side along the optic axis, and the correction of the movement of the image plane thereby is accomplished by moving the rearward group $G_R$ to the image side.

Conversely, to render spherical aberration over-corrected, the first lens group G1 is fixed and the second lens group G2 is moved to the object side along the optic axis, and the correction of the movement of the image plane thereby is accomplished by moving the rearward group $G_R$ to the object side.

By the rearward group $G_R$ being thus endowed with the focusing function and the image plane correcting function, a compact shape is maintained and yet improved operability is achieved.

FIGS. 5A–5I and 6A–6I show the point image distributions on the film surface (image plane) by spot diagrams in the first and second embodiments, respectively. FIGS. 5A–5C and 6A–6C show the point image distributions of the background, the main object and the foreground in the corrected state of spherical aberration, FIGS. 5D–5F and 6D–6F show the point image distributions of the background, the main object and the foreground in the under-corrected state of spherical aberration, and FIGS. 5G–5I and 6G–6I show the point image distributions of the background, the main object and the foregoing in the over-corrected state of spherical aberration.

As can be seen from these point image distributions, it is possible to vary the spacing between the first lens group G1 and the second lens group G2 in conformity with the photographer's liking to thereby change spherical aberration into the under-corrected state or the over-corrected state and provide a soft out-of-focus state differing in the depictive property in the foregoing or the background.

It is also possible to apply the present invention as a soft focus lens in which the amount of variation in the spacing between the first lens group G1 and the second lens group G2 is made group and more of spherical aberration is caused to occur, thereby extracting the depictive property of soft effect.

According to the present invention, there can be realized an optic system which maintains a compact shape and yet is excellent in operability and in which spherical aberration can be varied from the under-corrected state to the over-corrected state and astigmatism also occurs following this fluctuation of spherical aberration and therefore, for the main object, a good imaging performance can be maintained and yet for the foreground or the background of the object, a good out-of-focus state can be extracted and which has an excellent imaging performance over infinity to a short distance.

I claim:
1. An optical system including:
a forward group having a first lens group of positive focal length and a second lens group of negative focal length, said forward group having a positive focal length;
a stop; and
a rearward group having a positive focal length, said forward group, said stop and said rearward group being disposed in the named order from the object side, the spacing between said first lens group and said second lens group being varied along the optic axis to thereby fluctuate the spherical aberration and coma of said optical system and vary the depictive property of the image of the defocus area and also, fluctuate the astigmatism of said optical system following the fluctuations of the spherical aberration and coma, thereby maintaining the flatness of the image plane, said optical system being constructed so as to satisfy the following conditions:

$$0.5 < |f_2/f| < 1.0$$

$$0.5 < |f_1/f_2| < 1.5$$

where f is the focal length of the entire system of said optical system, and $f_1$ and $f_2$ are the focal lengths of said first lens group and said second lens group, respectively.

2. An optical system according to claim 1, constructed so as to be focused by said rearward group being moved along the optic axis.

3. An optical system according to claim 2, constructed so as to satisfy the following condition:

$$0.7 < f_R/f < 0.9$$

where $f_R$ is the focal length of said rearward group.

4. An optical system according to claim 1, wherein the numerical data are as follows:

| | f = 105, FN = 2, 2 ω = 23° | | |
|---|---|---|---|
| No | Radius of Curvatur r | Center thickness and spacing d | Refractive index n | Abbe number ν |
| 1 | 48.000 | 10.000 | 1.670249 | 57.53 |
| 2 | 446.083 | (variable) | | |
| 3 | 38.635 | 7.500 | 1.693500 | 53.72 |
| 4 | 66.090 | 2.500 | | |
| 5 | 255.958 | 3.000 | 1.688930 | 31.08 |
| 6 | 26.161 | (variable) | | |
| 7 | −31.507 | 3.000 | 1.717360 | 29.46 |
| 8 | −111.660 | 4.000 | | |
| 9 | −94.587 | 4.800 | 1.766840 | 46.80 |
| 10 | −40.030 | 0.200 | | |
| 11 | 112.887 | 4.800 | 1.796681 | 45.37 |
| 12 | −157.361 | (Bf) | | |

5. An optical system according to claim 1, wherein the numerical data are as follows:

| | f = 135, FN = 2, 2ω = 18° | | | |
|---|---|---|---|---|
| No | Radius of Curvatur r | Center thickness and spacing d | Refractive index n | Abbe number ν |
| 1 | 58.000 | 14.500 | 1.620409 | 60.14 |
| 2 | −569.905 | 3.000 | 1.648311 | 33.75 |
| 3 | 897.932 | (variable) | | |
| 4 | 44.435 | 8.000 | 1.713000 | 53.93 |

-continued

| | f = 135, FN = 2, 2ω = 18° | | | |
|---|---|---|---|---|
| No | Radius of Curvatur r | Center thickness and spacing d | Refractive index n | Abbe number ν |
| 5 | 100.005 | 2.600 | | |
| 6 | 626.470 | 3.000 | 1.749501 | 35.19 |
| 7 | 32.305 | (variable) | | |
| 8 | −40.174 | 3.000 | 1.688930 | 31.08 |
| 9 | −2506.608 | 7.000 | | |
| 10 | −412.962 | 5.000 | 1.766840 | 46.80 |
| 11 | −58.526 | 0.200 | | |
| 12 | 165.943 | 4.000 | 1.796681 | 45.37 |
| 13 | −136.822 | (Bf) | | |

* * * * *